United States Patent
Scheinderman et al.

[11] 3,722,774
[45] Mar. 27, 1973

[54] MOTION PICTURE PROJECTOR MEANS

[76] Inventors: Abraham Scheinderman, 2164 Regent Court No., Westbury; Karl Rudzitis, 16 Blanchard Street, West Babylon; Arthur Brandsdorfer, 8 Bartel Place, Huntington; George Wechsler, 1122 Harrison Street, North Bellmore, all of N.Y.

[22] Filed: Dec. 30, 1971

[21] Appl. No.: 214,087

[52] U.S. Cl. .....................226/62, 226/90, 352/159, 352/194
[51] Int. Cl. ...............................................G03b 1/22
[58] Field of Search........226/90, 113, 62, 65, 67, 76, 226/89, 92; 352/157–159, 194–196

[56] References Cited

UNITED STATES PATENTS

| | | | |
|---|---|---|---|
| 3,421,673 | 1/1969 | Nakamatsu | 226/92 |
| 3,524,573 | 8/1970 | Kotler et al. | 226/62 |
| 3,628,711 | 12/1971 | Martin | 352/194 |
| 3,637,124 | 1/1972 | Veno | 226/62 |

*Primary Examiner*—Allen N. Knowles
*Assistant Examiner*—Gene A. Church
*Attorney*—James P. Malone

[57] ABSTRACT

A motion picture projector in which the film is loaded in a straight line. A first roller forms an input loop and is then retracted. Second and third rollers wrap the film about the sound pick-up. Input and output sprockets are automatically de-clutched so that the sprockets are freely rotatable during the loop forming. In projection mode, the sprockets are driven and a claw device is engaged with automatic framing. Instantaneous stopping to view a single frame in fully framed position is provided by means for disengaging the claw from the film without stopping its linear oscillating motion, and at the same time de-clutching the sprockets. Control means are provided for simultaneously re-engaging the sprockets and re-engaging the film claw in the film without losing the framing.

4 Claims, 11 Drawing Figures

3,722,774

INVENTOR.

BY ABRAHAM SCHNEIDERMAN
KARL RUDZITIS
ARTHUR BRANDSDORFER
GEORGE WECHSLER

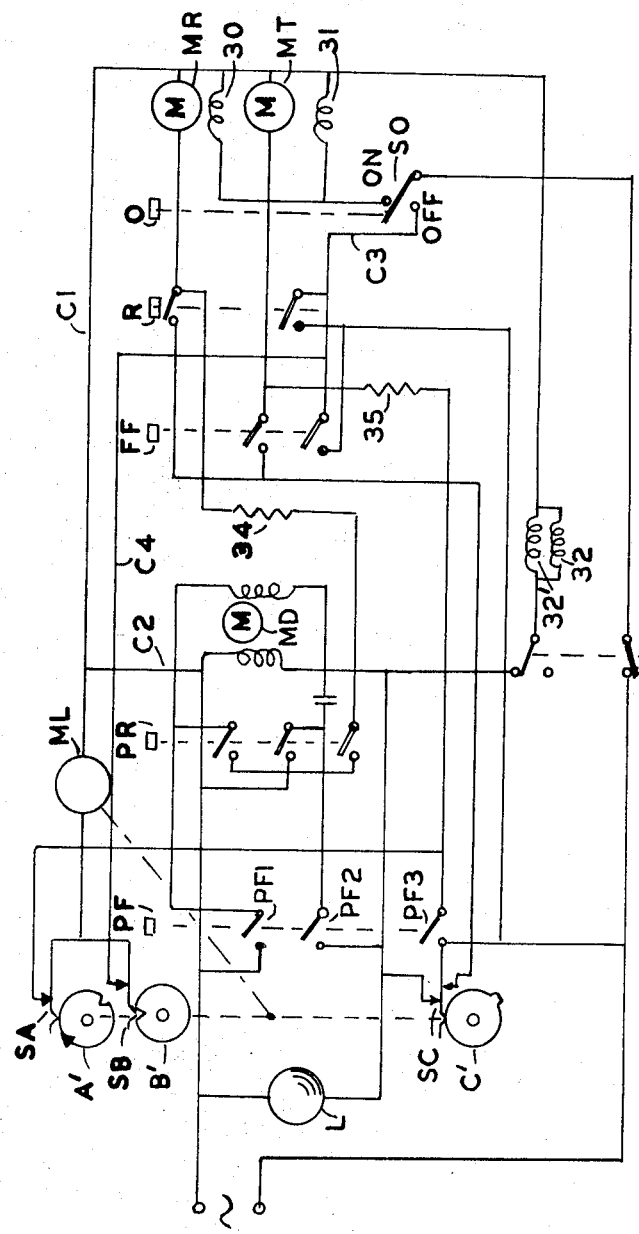
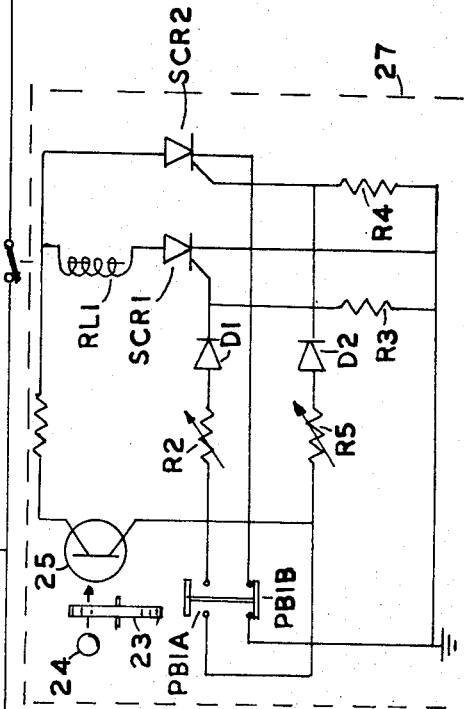
FIG 5
INVENTOR.
BY ABRAHAM SCHNEIDERMAN
KARL RUDZITIS
ARTHUR BRANDSDORFER
GEORGE WECHSLER

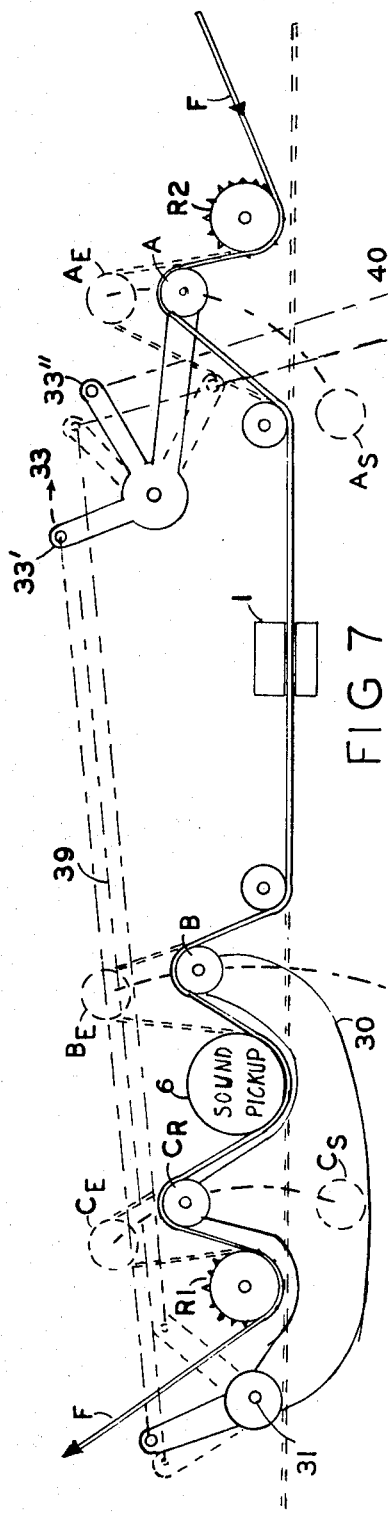
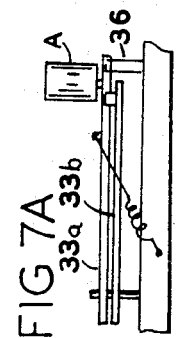
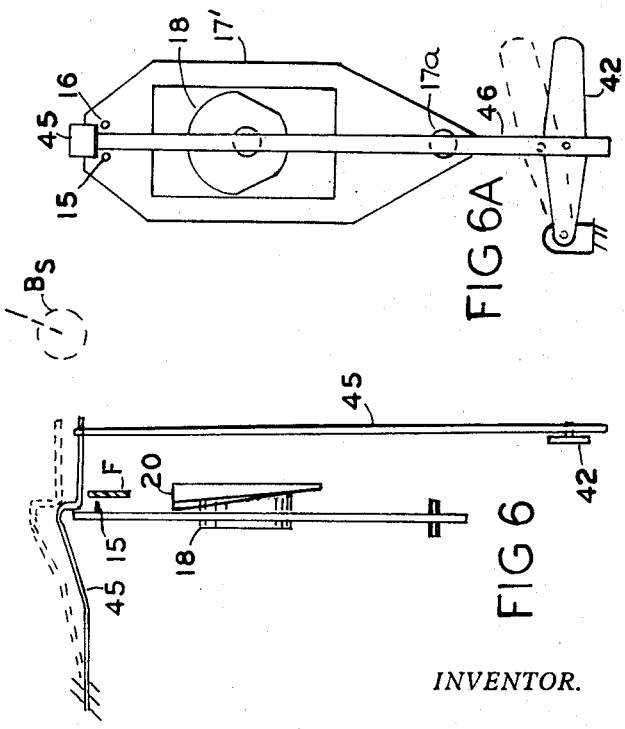

MOTION PICTURE PROJECTOR MEANS

This invention relates to motion picture projector means, and more particularly, to projectors having the means for loading the film in a straight line, automatically forming the necessary loops and engaging the claw drive with proper framing. Means are provided for substantially instantaneously stopping the film on a single frame with proper framing and for restarting the film with proper framing.

A principal object of the invention is to provide new and improved motion picture projector means.

Another object of the invention is to provide new and improved motion picture projector means having means to load the film into the projector in a straight line.

Another object of the invention is to provide new and improved motion picture projector means having means to load the film into the projector in a straight line, having means to form an input loop in said film and two output loops in said film to wrap said film around a sound pick-up, means for instantaneously stopping the film on a single frame by disengaging the claw drive without stopping the oscillatory linear motion of the claw.

Another object of the invention is to provide new and improved motion picture projector means having input and output reels, input and output sprockets, a film gate and a sound pick-up, means to load said film into said projector in a straight line, means to form an input loop in said film comprising a movable input roller, means to move said roller to form said input loop, means to drive said input sprocket, and means to release said input sprocket from said drive means while said input loop is being formed, means having a claw in said film gate, means to drive said claw, means to engage said claw in said film and means to instantly stop said film, comprising means to disengage said claw from said film without stopping the linear oscillating motion of said claw.

These and other objects of the invention will be apparent from the following specification and drawings of which:

FIG. 4A is a side view of FIG. 4.

FIG. 4B is a top view of FIG. 4.

FIG. 5 is a schematic circuit diagram.

FIG. 6 is a side view of an alternative claw latching mechanism.

FIG. 6A is a front view of FIG. 6.

FIG. 7 is a plan view of the loop forming mechanism.

FIG. 7A is a detail modification of FIG. 7.

GENERAL DESCRIPTION

Figure 1:
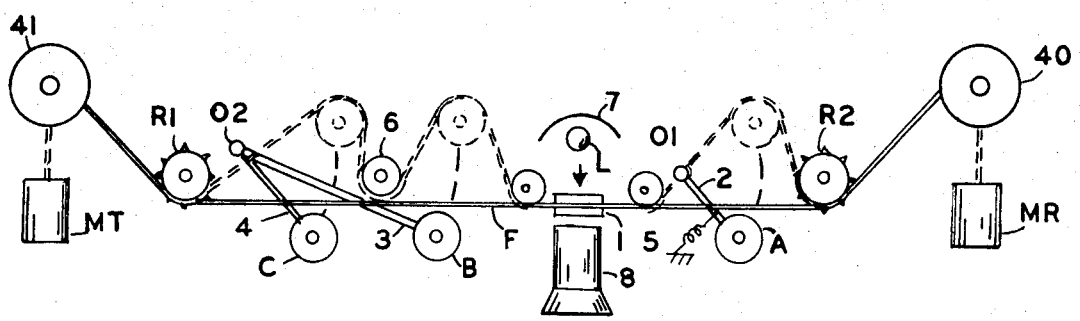
FIG. 1 is a top view of an embodiment of the invention.

A set of film take-up rollers is capable of automatically positioning the film, forming the required loops and the film tension. The rollers are operated on a horizontal deck permitting loading of the film spools directly in front of the aperture without the need of threading. After the film reels have been placed atop the deck in wound-up position, the film F is placed in film gate 1 in a straight line, as shown in FIG. 1. The Project Forward switch is then activated, rollers A, B and C (FIG. 1) pivot around their respective centers 01 and 02 and position the film in its operating "loop" path. Roller A may then fall back to its initial position, if desired.

After the film has been loaded and engaged as described above, claw assembly S (FIG. 4) transports the film through the aperture 1. The claw assembly is a mechanism moved by a two-cam assembly, one of which performs the front-to-back movement, and the other the side-to-side movement. The claw is negatively loaded, or in other words, it is pulled away from the film by means of the cam 20 and returned towards the film by means of a spring 21. Latch 22 is positioned next to the claw assembly and provided with an actuator to slide it in the direction indicated in FIG. 4.

A disc 23 concentric to the cam assembly and mounted on the same shaft has a slit 23' which controls photocell 25 assembly input to the controls (FIG. 5). The electronic circuit of this mechanism is shown in FIG. 5. When the "still picture" control is activated, latch 22 slides behind the claw plate 17 permitting it to idle side-to-side but preventing it from going in and out of the film perforations, thus stopping the film transport. Since the latch is able to slide behind the claw assembly only at the beginning or end of its stroke, the film is always stopped on full frame rather than midway between two frames. In order to assure that the film loops will be maintained throughout the run, regardless of the interruptions, the photocell circuit triggers the clutches M1 and M2 and the claw actuator 22' which are synchronized so that the film position is always the same relative to the film aperture.

SPECIFIC DESCRIPTION

Referring to FIG. 1, the film F is placed in the film gate 1 in a straight line. This is possible with the normal loading position of the rollers A, B and C shown in the full lines. In loading the film, it is taken with the right hand on the outside of the sprocket R2 and left hand on the outside of sprocket R1 stretched in a straight line and dropped into the film gate. Reel 40 is driven by rewind motor MR. Takeup reel 41 is driven by takeup motor MT.

The rollers A, B and C are pivotally mounted on arms 2, 3, 4 respectively. Upon pressing a switch, as will be explained, the rollers A, B and C rotate around their pivot points 01 and 02 to position the film as shown by the dotted line positions. The position of roller A is momentary and is automatically retracted by the spring 5 as soon as the input loop is formed. The rollers B and C are held in the loop forming position in order to wrap the film around the sound pick-up 6 for normal operation in the projection mode. The light source 7 and lens system 8 may be conventional. The roller arms may be operated by solenoids or by a linkage, as shown in FIG. 7.

Figure 2:
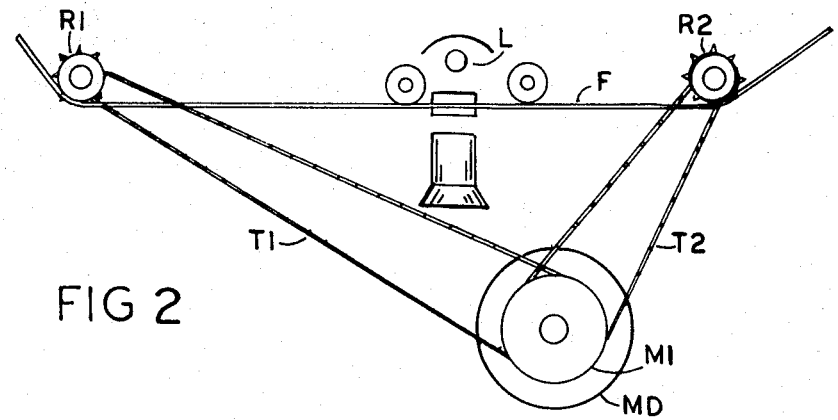
FIG. 2 is a top view of the sprocket draive.
Figure 3:
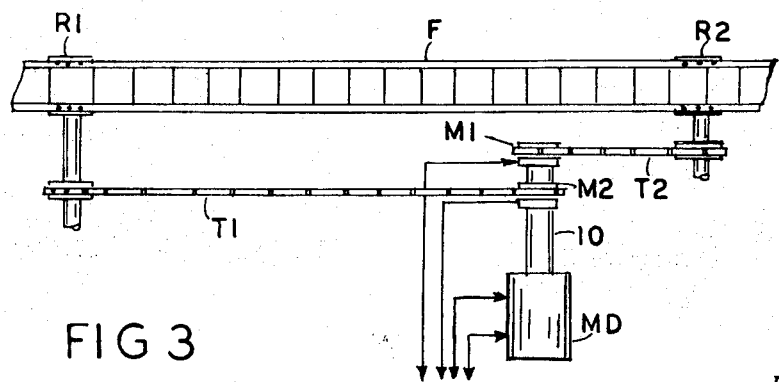
FIG. 3 is a front view of FIG. 2.

FIGS. 2 and 3 show the sprocket drive. The input sprocket R2 is driven by a timing belt T2 which is connected to the drive shaft 10 to reversible motor 11 by means of the clutch M1. The output sprocket R1 is driven by the timing belt T1, which is connected to the drive shaft 10 by means of the clutch M2. When the loops are being formed, the clutches M1 and M2 are disengaged so that the sprockets R1 and R2 are both free and will rotate in opposite directions when the loops are being formed. When the clutches are engaged, both sprockets will rotate in the same direction, whether it be forward or reverse.

Figure 4:
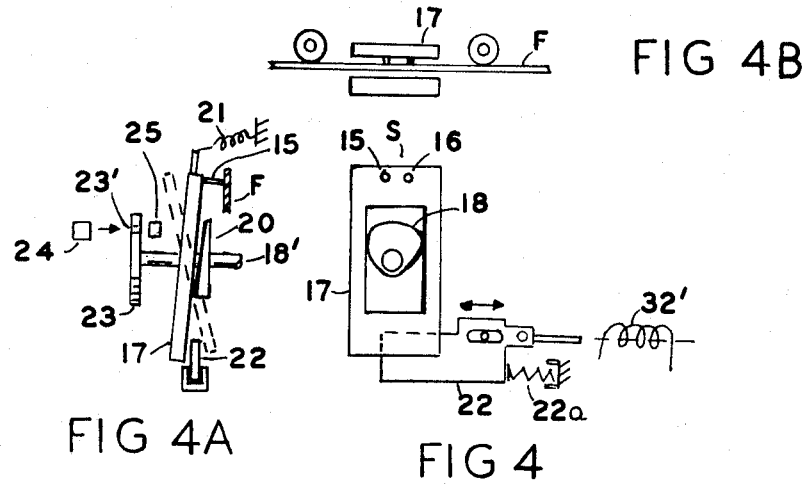
FIG. 4 is a front detail view of the claw drive mechanism.

FIGS. 4 and 4A show the claw drive mechanism. The claw comprises two prongs 15 and 16 which are mounted on a plate 17. The two prongs 15 and 16 are adapted to engage sprocket holes in the film F. The plate 17 is mounted for oscillatory movement parallel to the axis of the film and is oscillated by means of the driven cam 18. The plate 17 is periodically tilted by means of the cam 20 so that the claw engages the film when the claw is moving in a forward direction and disengages the film when the claw is being turned in the opposite direction. The claw mechanism described thus far is conventional.

The claw is normally urged to engage the film by means of the spring 21. In order to stop the film instantaneously in fully framed position in accordance with the present invention, a latch 22 is slidably mounted so that when it is inserted behind the plate 17, it would hold the plate 17 in disengaged position, as shown by the dotted lines in FIG. 4A. Note that the latch will only engage the plate 17 when the plate 17 is on its return stroke and is disengaged from the film. Therefore, no matter when the latch is actuated, it will only latch out the plate 17 when the plate 17 is on its next return stroke, so that the film remains fully framed.

In order to reengage the claw at the start of its forward stroke, a photo-electric detector system is provided, comprising a shutter disc 23 which is mounted on the cam shaft 18'. The shutter 23 has a small aperture 23'. There is a light source 24 in front of the shutter and a photodetector 25 behind the shutter. The photodetector is only energized as the claw starts on its forward stroke, since the position of the aperture 23 is so chosen.

FIG. 5 shows a schematic circuit diagram.

The mechanism is controlled by a series of interlocked pushbuttons of the type which, when one is pushed, the others are mechanically pushed up.

The pushbuttons are as follows:
Pushbutton PF — Projection forward
Pushbutton PR — Projection reverse
Pushbutton FF — For fast forward operation
Pushbutton R — For rewind operation
Pushbutton O — For "off."

The cams A', B', and C' are mounted on the shaft of the load motor ML. The motor MD is connected to drive the claw end and is also connected to drive the sprockets through the clutches M1 and M2. The motor MR is connected to the rewind reel 40 and the motor MT is connected to the take-up reel 41.

General Control Circuit Operations is as follows:

Switching cams A', B', and C' are mounted on the shaft of film loading motor ML.

LOOP FORMING

1. Depress "projector forward" switch PF.
   a. Load motor ML is activated to form loops, cam A' turns until switch SA falls in notch and turns load motor off. Loops are now formed.
   b. "Off" switch SO is connected so that brake solenoids 30 and 31 are activated and loosen brake bands. Take-up motor MT is in operational mode.
   c. Cam C' turns until cam node activates drive motor switch C.
   d.
      (1) Drive motor MD on in forward mode.
      (2) Take-up motor on.
      (3) Projector lamp L on.
      (4) Clutch solenoid 32 is on.
2. Depress "projector reverse" switch.
   a. Drive motor MD reverses.
   b. Rewind motor MR is on.
   c. Take-up motor is off.
   d. Lamp L stays on.
   e. Clutch solenoid stays on.
3. Depress "off" switch SO.
   a. Load Motor activated cam B' turns until switch SB falls in notch, motor off, film straight.
4. "Rewind" switch.
   Rewinds film.
5. "Fast forward" switch provides fast film advance.

More specifically, the circuit operation is as follows:

The control switch is a five-button switch which is mechanically interlocked so that by pressing one button down, all of the other buttons pop up. The button positions are:
Projection Forward
Projection Reverse
Fast Forward
Rewind
Off

LOOP FORMING AND PROJECTION FORWARD MODE

After the film is inserted in a straight line, as previously described, press "Projector Forward" button, switch PF. This causes the following:

a. Film loading motor ML is activated through switches SA and PF1. Motor ML then turns cam A' approximately 225° until the blade of switch SA falls into the notch in the cam, opening switch PF1 and turns the loading motor ML off. The loops are now formed and have slack in them, since the loading motor and linkage is turned more than 180°.

b. "Off" switch SO is connected to brake solenoids 30 and 31, which are energized to loosen the normally tight brake bands.

c. Cam C' has turned the same number of degrees as Cam A', at which point the bump on Cam C' will close switch SC.
   1. This connects and energizes the drive motor MD in forward mode through switch SC.
   2. Take-up motor MT is energized through switch PF3. The other side of the take-up motor M3 is connected to the other side of the line-through conductors C1 and C2.
   3. The projector lamp L is turned on through Switch SC. The clutch solenoid 32 is energized through switches SC and SCL.

PROJECTION REVERSE MODE

Depress projection reverse switch PR which makes the following connections:

a. Drive motor MD reverses through switches PR1 and PR2.

b. Rewind motor MR is energized through PR3. The other side of the motor is connected to the other side of the line through conductors C1 and C2.

c. Take-up motor MT is off, since PF3 is open.

d. Projection lamp L remains on through switch SC.

e. Solenoid 32 for clutch M1 remains energized.

"OFF" SWITCH SO

Depressing "Off" switch SO causes the following:

Load motor ML is activated through conductors C3 and C4, and switch SB and continues turning until the switch SB falls into the notch of cam B' and turns the load motor off in start position with the film in a straight line position.

The switching is arranged so that the "fast forward" and "rewind" buttons cannot be pushed until the "off" button is pushed so that the film will be in a straight line for "fast forward" and "rewind."

REWIND

Pushing the "rewind" button actuates the rewind motor MR through switch SC. This mode has a faster operation than normal rewind as resistor 34 is bypassed.

FAST FORWARD MODE

Closing the "fast forward" switch energizes the take-up motor MT through switch SC. This mode is faster than normal as resistor 35 is bypassed.

The control circuit 27 comprises a pair of silicon control rectifiers which are adapted to synchronize the operation of the claw motor and the clutches M1 and M2. This circuit is best described by describing its operation, which is as follows:

A. In projection mode, PB1 is normally in position shown. (PB1A Open; PB1B closed).

B. Silicon control rectifier SCR2 is, therefore, normally activated since the first light to hit phototransistor 25 applies a positive DC pulse to the gate of SCR2 through potentiometer R5 and diode D2. Clutches M1 and M2 are energized by solenoid 32 in projection mode. Latch solenoid 32' is energized in projection mode in unlatching position. Latch 22 is pushed into latching position by spring 22a when the solenoid is de-energized. Potentiometer R5 controls sensitivity of turn on of SCR2 so that it is not triggered by stray light. Diode D2 prevents the voltage appearing on SCR2 gate from reaching the emitter of photo transistor 25.

C. To instantaneously stop the film, switch PB is depressed. Depressing PB1B opens SCR2, turning it off. SCR1 is now armed by PB1A and will turn on when light hits phototransistor 25 which delivers a positive voltage through PB1A, R2 and D1. Resistor R2 and potentiometer D1 serve the same functions as R5 and D2 for SCR2. Resistors R3 and R4 prevent undesired activation of SCR1 and SCR2 by acting as a low impedance shunt for transients.

D. The first light pulse hitting phototransistor 25, therefore, turns on SCR1 while PB1 is depressed. Relay RL1, which controls the claw-latch mechanism is de-energized and clutches M1 and M2 de-energized, stopping motion of the film without losing the loops. As long as PB1 is held down, SCR1 remains on regardless of the fact that disc 23 continues to rotate.

E. When PB1 is released, SCR2 is now armed and turns on at the next light pulse hitting phototransistor 25, as explained in Item B above.

F. SCR2 then shunts current from SCR1 such that SCR1 returns to its blocking state as the current available to it is far less than its minimum holding current. Relay RL1 is then de-energized and the machine returns to its motion picture mode at such a time as to avoid loss of the loop.

FIGS. 6 and 6A show a modification of a claw latching mechanism. The claw 15, 16 is mounted on the plate 17' which is pivotally mounted on pin 17a and which is adapted to be oscillated by means of the cam 18. The claw plate 17 and claw 16 are moved into film engaging and disengaging position by means of the cam 20, in conventional manner as previously described in connection with FIG. 4. The claw plate 17 is latched into non-engaging position by means of the spring cam member 45. The full line position of the spring cam member 45 latches the claw out of engagement with the film F. The spring cam member 45 is adapted to be actuated by means of the linkage member 46 and the lever 42, which is pivotally mounted on the frame. The lever 42 may be actuated manually or with a solenoid. When the lever is pushed to the dotted line position, the member 45 does not engage the plate 17 and the film is driven by the claw 16. When the lever 42 is pulled to the full line position in FIG. 6A, then the spring cam member 45 is pulled to its full line position in FIG. 6, which pushes the plate 17 and claw 16 to the left in FIG. 6, and out of engagement with the film without stopping the oscillation of the claw 16 by means of the cam 18.

FIG. 7 shows the linkage for operating the rollers A, B and C. The rollers B and C are mounted on an arm 30 having two projections. The arm 30 is pivotally mounted on the pin 31 and is operated by the linkage member 39. The roller A is mounted on the member 33 having two extending arms 33' and 33". One end of the linkage member 39 is connected to the arm 30 and the other end is connected to the arm 33' of member 33. The arm 33" is also connected by linkage member 40 to load motor ML.

When the lower end of linkage member 40 is in position S, the rollers are retracted to film loading positions AS, BS, CS. positions AR, When the motor ML rotates clockwise to position E, both arms 30 and 33 rotate counterclockwise, thereby moving the rollers A, B and C into full loop forming positions, AE, BE, CE. When motor ML rotates to position R, the rollers back off slightly from full loop forming position to positions are BR, CR so that the film is not too taut. Alternatively, the linkage 39, 40, may be operated by a manually operated knob having detents at the three operating positions.

If it is desired to form the loop and then have roller A drop back completely, the roller A arm assembly 33 may comprise an upper arm 33a, FIG. 7A, on which is mounted the roller A and a lower arm 33b, which has a projection 33c. The upper arm 33 a is freely rotatable. When the arm 33a comes into full loop forming position, it rides up on the fixed cam 36 so that it rises above projection 33c and it is pulled back by spring 37 against a stop, leaving a free loop of film. The projection 33c is cam shaped so that when the arm 33b is retracted then the projection 33c will engage the arm 33a again.

Rollers A and B may also be constructed in this manner if desired.

We claim:

1. In a motion picture projector having input and output reels, input and output sprockets, a film gate, and a sound pick-up, means to load said film into said projector in a straight line, means to form an input loop in said film comprising a movable input roller, means to move said roller to form said input loop, means to drive said input sprocket, means to release said input sprocket from said drive means while said input loop is being formed, output loop forming means adapted to wrap said film about said sound pick-up comprising a pair of pivotally mounted rollers, means to energize said pivotally mounted output rollers to form two loops in said film, a claw in said film gate, means to drive said claw to move said film, and means to instantly stop said film, comprising means to disengage said claw from said film without stopping the linear oscillating motion of said claw.

2. Apparatus as in claim 1 having motor means for driving said input and output sprockets in forward and reverse directions, clutch means connecting said motor means to said input and output sprockets, and means to control said clutch means so as to release said input and output sprockets and make them freely rotatable when said loops are being formed.

3. Apparatus as in claim 2 wherein said claw disengaging means always releases said claw from said film when a picture is fully framed, whereby the film may be stopped substantially instantaneously in full framed position for projecting a still picture of an individual frame.

4. Apparatus as in claim 3 having means to re-engage said claw to drive said film while maintaining the proper framing of said film.

* * * * *